United States Patent [19]
Poyner et al.

[11] Patent Number: 6,085,769
[45] Date of Patent: Jul. 11, 2000

[54] TELECOMMUNICATIONS ELECTRONICS ENCLOSURE DRAIN VALVE

[75] Inventors: Julian Russell Poyner, Denton; John Andrew Durban, Boxted, both of United Kingdom

[73] Assignee: Northern Telecom Limited, Montreal, Canada

[21] Appl. No.: 09/028,801

[22] Filed: Feb. 24, 1998

[30] Foreign Application Priority Data

Dec. 22, 1997 [GB] United Kingdom ............. 9726982

[51] Int. Cl.[7] ............................ F16K 15/14
[52] U.S. Cl. ................... 137/2; 137/848; 137/844
[58] Field of Search .................... 137/844, 848; 343/720

[56] References Cited

U.S. PATENT DOCUMENTS

| | | | |
|---|---|---|---|
| 223,396 | 1/1880 | Shabley | 137/848 |
| 425,530 | 4/1890 | Wayte | 137/848 |
| 2,203,797 | 6/1940 | Pearson | 137/848 |
| 2,598,035 | 5/1952 | Bulkley | 137/848 |
| 2,969,066 | 1/1961 | Holter et al. | 137/848 |
| 3,885,561 | 5/1975 | Cami | 137/848 |
| 3,899,135 | 8/1975 | O'Brian | 137/848 |
| 4,007,460 | 2/1977 | Hanfling et al. . | |
| 4,305,339 | 12/1981 | Inglis | 112/281 |
| 4,660,049 | 4/1987 | Shinkawa . | |
| 4,795,563 | 1/1989 | Auchincloss | 210/662 |
| 5,618,276 | 4/1997 | Leise, Jr. et al. | 604/336 |

*Primary Examiner*—Denise L. Ferensic
*Assistant Examiner*—Joanne Y. Kim
*Attorney, Agent, or Firm*—Lee, Mann, Smith, McWilliams, Sweeney & Ohlson

[57] ABSTRACT

The present invention relates to environmental control apparatus for telecommunications equipment, and in particular, relates to a radio telecommunications electronics enclosure drain valve. A base station antenna electronics enclosure typically comprises antenna arrangements and associated control cabinets. Whilst ideally the internal space within an electronics enclosure is hermetically sealed, this is not generally possible due to, inter alia, the differential expansion of the different components within the enclosure, the need for access for maintenance purposes, the electrical performance characteristics and so on. The antennas are contained within an antenna enclosure—the enclosures on masts visible to the public. In order to provide a sufficient field of coverage, the antenna should be placed at a height above ground level, typically upon a building or a mast, extending 15 m or more. In such a position, an antenna enclosure is subject to extremes of temperature, windage and moisture. It has been determined that antenna enclosures are particularly susceptible to water ingress, which can accumulate within the enclosure, at the bottom of a enclosure. The present invention seeks to overcome water ingress problems and provides a telecommunications base station electronics enclosure which possesses improved water control characteristics.

12 Claims, 6 Drawing Sheets

TELECOMMUNICATIONS ELECTRONICS ENCLOSURE DRAIN VALVE

FIELD OF THE INVENTION

The present invention relates to environmental control apparatus for telecommunications equipment, and in particular, relates to a radio telecommunications electronics enclosure drain valve.

BACKGROUND TO THE INVENTION

Cellular radio systems are currently in widespread use throughout the world providing telecommunications to mobile users and to fixed wireless access subscribers. In order to meet the capacity demand, within the available frequency band allocation, cellular radio systems divide a geographic area to be covered into cells. A base station communicates with the mobile users and to fixed wireless access subscribers over the air interface, each base station typically being equipped with directional antenna arrays arranged in three or six sectored sub-cells where the higher gain of the narrow beamwidth antennas improve the uplink from the lower power mobiles. The distance between the cells is determined such that co-channel interference is maintained at a tolerable level.

Each base station has a connection with a base station controller and is typically linked with a standard (wired) public telephone service to provide links with ordinary telephone subscribers. A base station antenna arrangement typically comprises a number of antennas, such as, dipole, patch or layered antennas. The antennas are contained within an antenna enclosure. The dimensions of an enclosure in the range 0.1–3 m wide, with the height typically being of a similar order. Antenna enclosures of the so-called smart variety also contain beamforming electronics within the enclosure.

Whilst the internal space within the antenna is ideally hermetically sealed, this is not possible due to, inter alia, maintenance requirements and the physical characteristics of the different components within the antenna, such as differential expansion which can be as great as 10 mm across the length of an enclosure. The antenna radome (the part of the antenna through which the antenna radiates) must be transparent to microwave radiation and can be of a generally light weight construction, whilst the back to the enclosure must be sufficiently strong to provide support for the antennas themselves, electronics (if installed and allow the whole antenna to be mounted upon a mast or similar support, and is accordingly not insignificant in weight—the weight of an enclosure can be up to 150 kg or so. Even if it was possible to totally seal an enclosure, differences in temperature and pressure would distort the radome, which in turn would affect the microwave performance of the antenna. In practice, antenna enclosures are semi-sealed.

Figure 1:
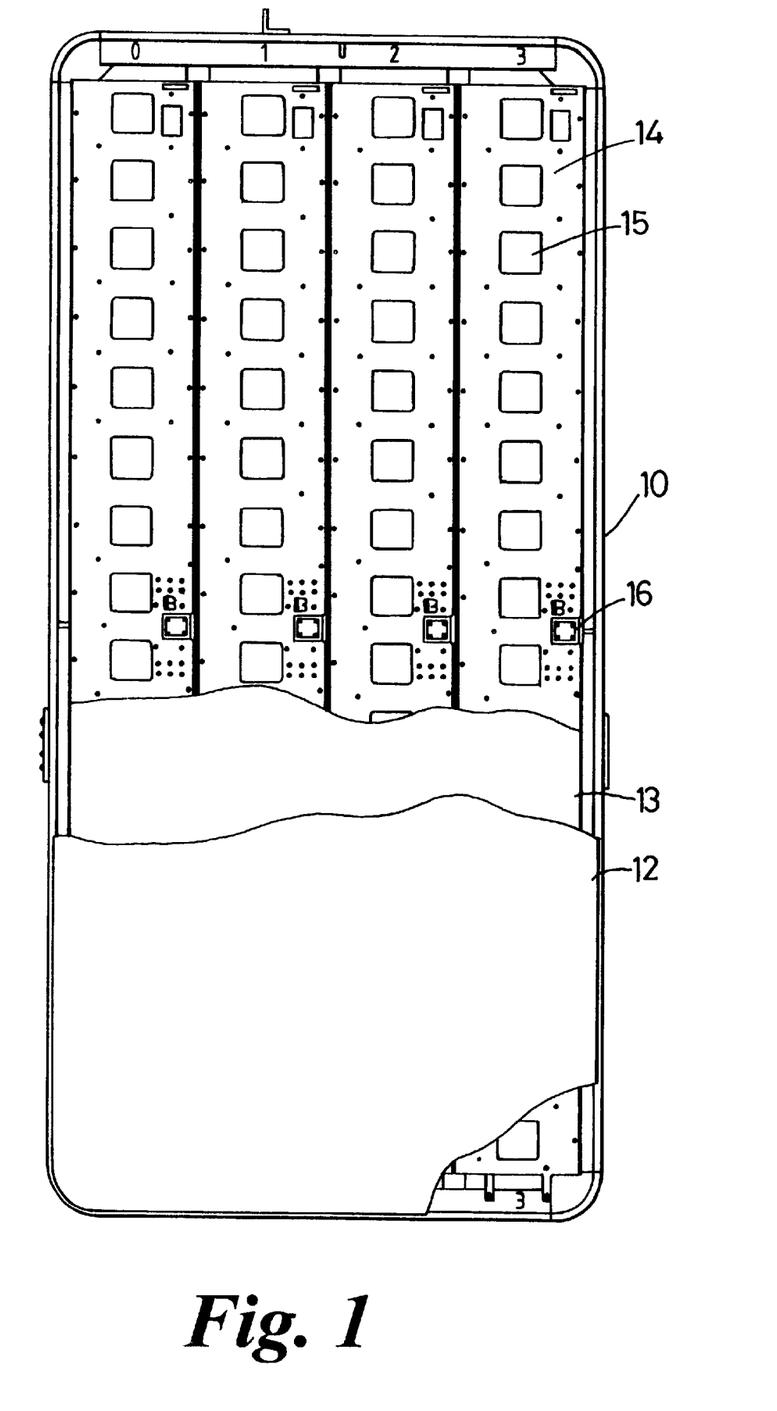
FIG. 1 shows a part cutaway antenna enclosure.

In order to provide a sufficient field of coverage, the antenna should be placed at a height above ground level, typically upon a building or a mast, extending 15 m or more. In such a position, the antenna enclosure is subject to extremes of temperature, windage and moisture. It has been determined that certain equipment such as antenna enclosures are susceptible to water ingress, which can accumulate at the inside bottom of such an enclosure. Such water ingress does not necessarily arise from precipitation; in areas with a high humidity and/or high diurnal temperature change can suffer severe condensation problems. With an antenna such as is shown in FIG. 1, in the case that only one antenna element was partially submerged by water, because of the layout of the antenna, this would have the effect that the lower four elements do not operate effectively, with a total reduction of around 1 dB being typical. Needless to say, this has a concomitant effect upon the reliability of the antenna. In the case of smart antennas, the associated electronics equipment may be susceptible to failure if subjected to moisture.

Presently, antennas are typically equipped with Gore-tex patches to enable water vapour to pass from the inside to the outside of the enclosure, but such patches do not allow water flow. A further approach has required the components within an enclosure to be coated with a protective finish and to provide relatively large holes for most water to drain out, but this is somewhat crude and maintenance and repair operations can be hampered and, further, such an approach is unsuitable for smart antennas which incorporate active electronics within the enclosure. Ventilators as used and developed for telecommunications control boxes and equipment racking, having a gauze or grid which allows air or liquids to filter through have been employed, but allow liquids to pass in both directions through the filter. A U-bend arrangement has also been employed, which requires the presence of a liquid—which cannot be guaranteed in warm conditions, also the liquid may get blown from the tube under positive pressure as the enclosure "breathes". Further, neither of these devices are truly non-return valves.

For a valve to operate in such a fashion that the atmosphere within the enclosure is controlled, then the amount of water present within the enclosure must be minimal, liquid must be able to pass through the valve at high rates, the size of any openings must be less than approximately 100 $\mu$m, whereby insects, dust, pollen or other foreign bodies are prevented from entering the enclosure. Any valve mechanism must be able to self-clear, or, preferably, not get clogged under any circumstances. The materials of any components must be able to withstand climatic extremes and u.v. degradation.

OBJECT OF THE INVENTION

The present invention seeks to overcome the above mentioned problems and to provide a telecommunications base station enclosure which possesses improved water control characteristics.

STATEMENT OF THE INVENTION

In accordance with a first aspect of the invention, there is provided a communications electronics enclosure drain valve comprising:

a plastics tube, and;

an adaptor;

the tube being connected to the adaptor at a first end and being closed at a second end;

wherein the tube defines a cylindrical cavity defined by a wall and said tube possesses an axial slit through the wall;

the adaptor defines a channel which communicates with the tube at a first end and provides an orifice at a second end, and;

wherein the drain valve is adapted for attachment to an area of the electronics enclosure susceptible to the accumulation of liquid by way of the adaptor, with the orifice being positioned to receive excess liquid and the valve is adapted to allow the flow of liquid through the orifice, the tube and then the slit with a minimal head of water.

The tube can be terminated by a bung comprising a solid, non-porous material of circularly cylindrical cross-section having the dimensions of an external diameter corresponding to the internal diameter of the tube. The bung can conveniently—and preferably—be of a friction fit or can be attached by well known clamp means. The axial slit, for a thermoplastic elastomer of internal diameter 5.5 mm and wall thickness of 0.75 mm can be as short as 9 mm. For different materials, diameters of tube and wall thicknesses this length will vary for an optimum flow rate when allowing the passage of water from the enclosure and for an optimum seal against ingress of insects, water and other contaminants when not allowing the outflow of water. The adaptor can interface directly with the wall of the electronics enclosure, but is preferably provided with a seal comprising a grommet or similar type of sealing washer. The adaptor is preferably of such dimensions such that it protrudes above a lower level of the electronics enclosure whereby any debris which may be present does not flow into the orifice.

The tube and grommet are conveniently manufactured from a similar plastics material such as a thermoplastic elastomer or silicon rubber. The adaptor and bung can conveniently be manufactured from a solid plastics material such as u.v. stable Nylon 6.6 or a corrosion-proof metal such as an aluminium alloy. Alternatively it would be possible to construct an integral drain valve, adaptor and grommet employing injection moulding techniques.

In accordance with a second aspect of the invention there is provided a communications electronics enclosure drain valve comprising: a plastics tube, closed at one end, the open end being adapted to receive liquids from and to be sealed with the enclosure, wherein the tube defines a cylindrical cavity defined by a wall and said tube possesses an axial slit through the wall; and wherein the drain valve is adapted to allow the flow of liquid through the slit with a minimal head of water.

In accordance with a third aspect of the invention, there is provided a communications electronics enclosure comprising electronic equipment and having a drain valve which is attached to an area of the enclosure susceptible to the accumulation of liquid, wherein the valve is normally closed and is adapted to allow the flow of accumulated liquid through the valve, in the presence of a minimal head of water.

In accordance with a fourth aspect of the invention, there is provided a method of draining liquid from an electronics enclosure, the electronics enclosure including a drain valve positioned in an area of the electronics enclosure susceptible to the accumulation of liquid, the drain valve comprising: a plastics tube, and; an adaptor; the tube being connected to the adaptor at a first end and being closed at a second end; wherein the tube defines a cylindrical cavity defined by a wall and said tube possesses an axial slit through the wall; the adaptor defines a channel which communicates with the tube at a first end and provides an upwardly facing orifice within the enclosure at a second end, the orifice providing an entrance for liquid to the cylindrical cavity, the method, upon ingress of liquid into the enclosure such that the level of the surface of the water exceeds the height of the lowest level of the orifice, comprising: removal of such liquid by gravitational forces through the orifice and within the tube, the weight of the liquid urging the slit to open and allow such liquid to escape.

BRIEF DESCRIPTION OF THE FIGURES

In order that the present invention can be more fully understood and to show how the same may be carried into effect, reference shall now be made, by way of example only, to the Figures as shown in the accompanying drawing sheets wherein:

FIGS. 7.1, 7.2 show photo-micrographs of a slit aperture.

DETAILED DESCRIPTION OF THE PREFERRED EMBODIMENTS

There will now be described by way of example the best mode contemplated by the inventors for carrying out the invention, in relation to a telecommunications base station antenna enclosure. In the following description, numerous specific details are set out in order to provide a complete understanding of the present invention. It will be apparent, however, to those skilled in the art that the present invention may be put into practice with variations of the specific, for example, ground level base station control cabinets.

Figure 2:
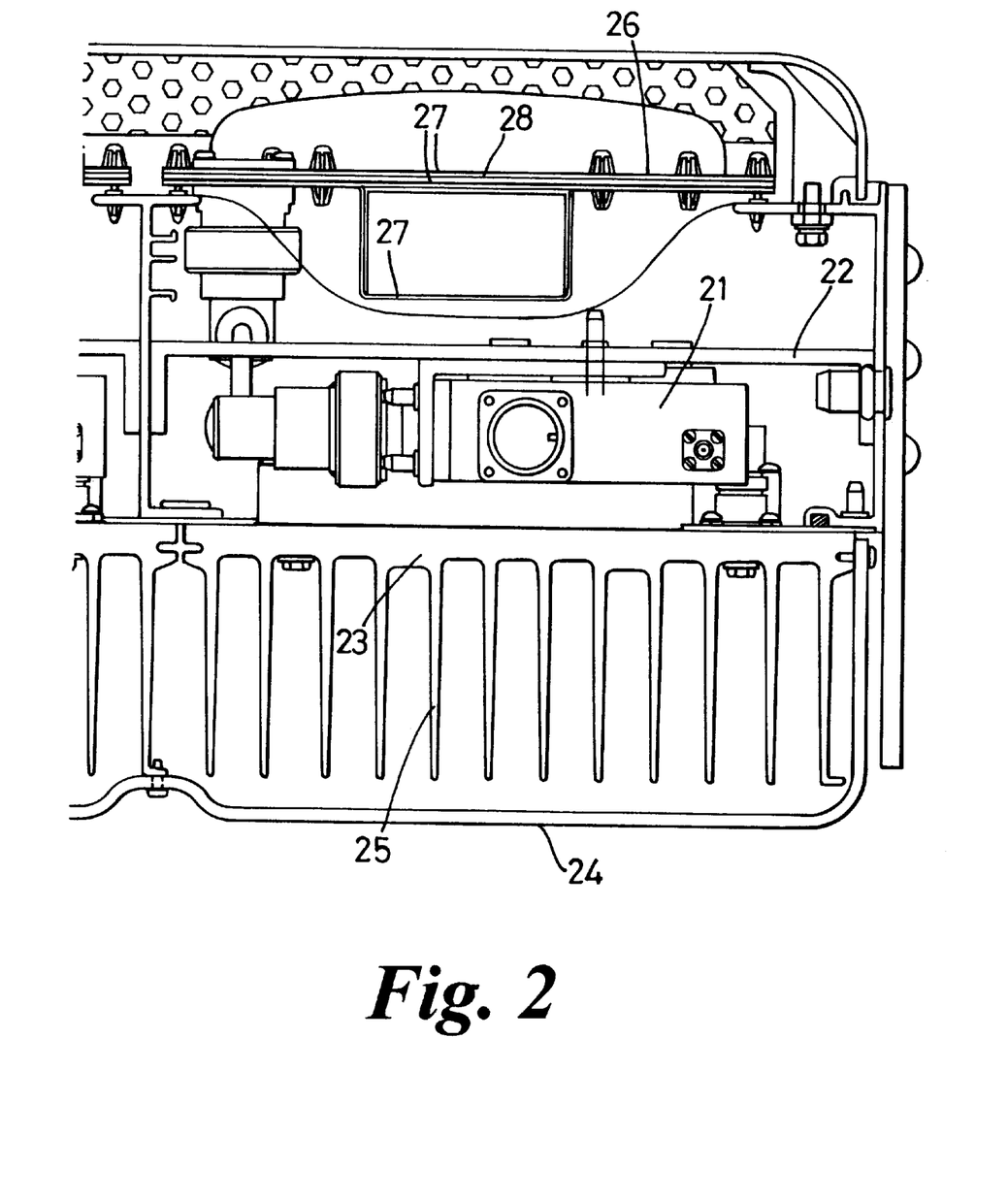
FIG. 2 shows a partial cross section of the antenna shown in FIG. 1.

Referring now to FIG. 1, there is shown an antenna enclosure to having its radome 12 and outer foam spacer 13 cut away to expose four parallel spaced apart antenna arrays 14, each array having sixteen radiating elements 15. The sixteen radiating elements operate in groups of four and are receive microwave signals from a microstrip track (not shown) which lead from an offset feed port 16. Each feed port locates with an output from a microwave transceiver which is supported on the back of the enclosure, as seen more clearly in FIG. 2, which details in partial perspective view and partial cross sectional view further components of a smart base station antenna enclosure. On the reverse side of the enclosure, r.f. filtering and low noise amplification means are contained within an enclosure 21, which is connected to an internal structural member 22. To enable heat to be dissipated such that the associated high power amplifiers are maintained within acceptable temperature ranges a heat sink 23 is provided. The high power amplifiers dissipate up to 0.4 kW of heat. An enclosure 24 surrounds fins 25 associated with the heat sink, to provide a solar shield. An antenna array is also shown in cross-section in this Figure and the ground planes 27, dielectric film supporting microstrip circuitry 28 and the dielectric spacer 29 can also be identified.

Figure 3:
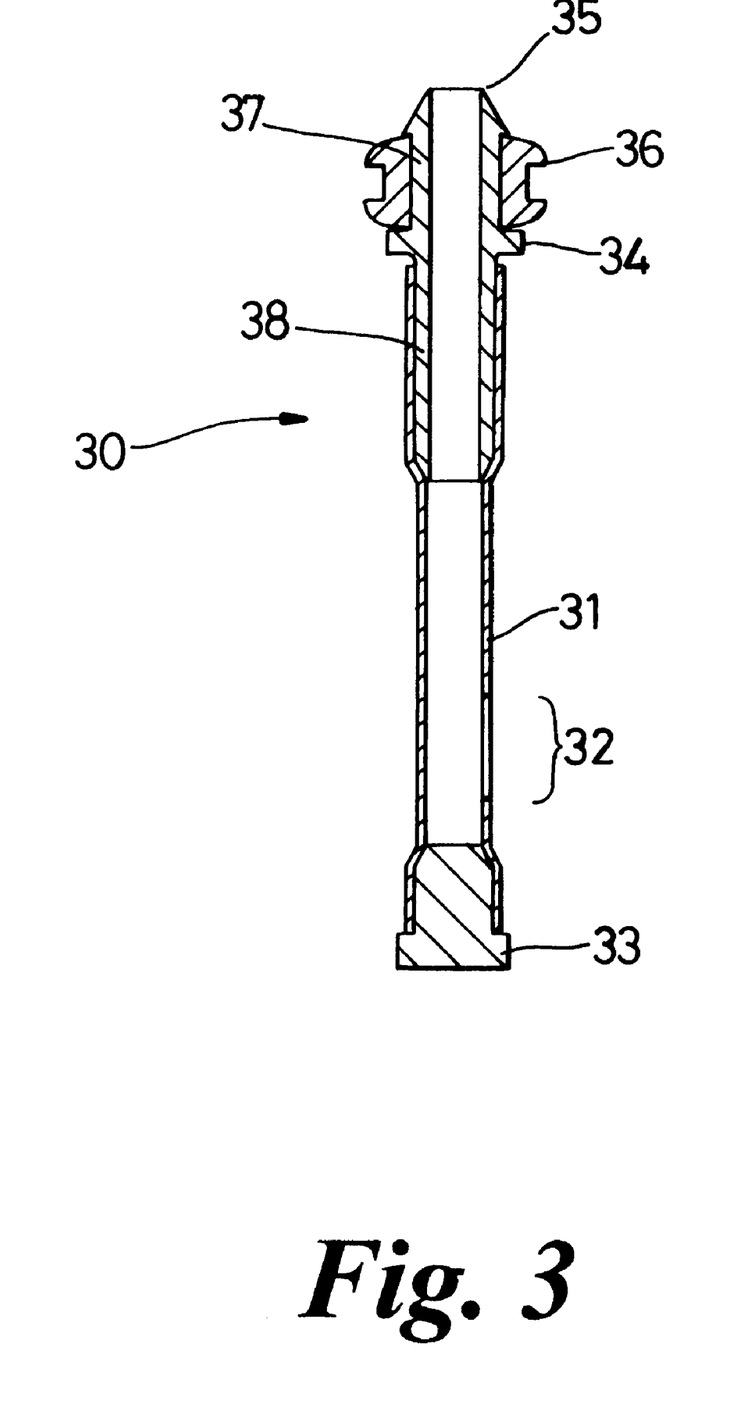
FIG. 3 shows a sectional view of a first embodiment of the invention.

FIG. 3 shows a drain valve 30 made in accordance with a first embodiment of the invention. The drain valve comprises a flexible plastics tube 31 having an internal diameter of 5.5 mm an through which an axial slit 32 is cut. For a tube of thermoplastic elastomer having a diameter of 5.5 mm and a wall thickness of 0.75 mm was found that a slit of at least 9 mm length allowed water flow. The slit can be formed by a scalpel-blade equipped jig arrangement, but many other methods could be employed. The tube is blocked at one end with a bung 33, although a variety of means could be employed, for instance the tube could be clamped shut. What ever means is employed to close the tube at its open end, no forces should be exerted such that the slit is distorted into a semi-open rest position. For a tube of thermoplastic elastomer having dimensions as stated above, it was found that a distance of 4 mm from the slit to the bung was sufficient spacing not to cause any distortion of the slit. The adaptor, in an operating position, has an uppermost point defining a nozzle like element 34 having a central orifice 35 and a general frusto-conical shape. A reduced diameter section 35 has a length sufficient to seat a grommet 36, which length is determined by a collar 37. The adaptor continues with a cylindrical section or shank 38 over which the plastics tube is attached. For ease of insertion of the plastics tube, the cylindrical section has a frusto-conical termination, although other shapes may equally well aid insertion. It has been found that cylindrical section should be of a sufficient length whereby a person installing the drain can conveniently retain the device between free-finger and thumb.

Figure 4:
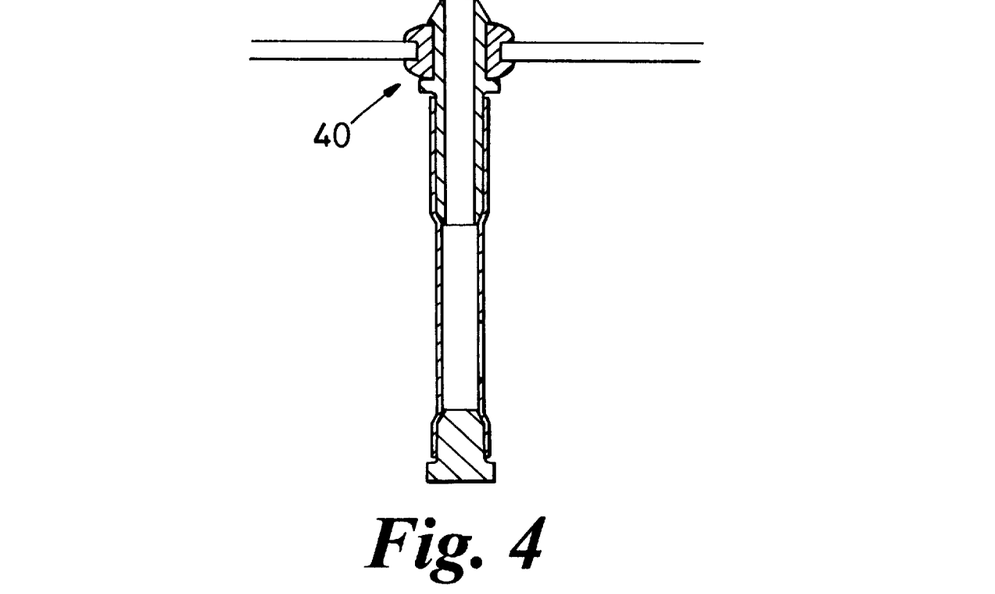
FIG. 4 shows the location of an embodiment in relation to an antenna enclosure.

FIG. 4 shows how the adaptor lies within a circular aperture 40 defined within an enclosure. The aperture within the radome can be pre-formed during the manufacturing process or can be created by other means, for example a twist drill—although care should be taken to remove any swarf created.

Figure 5:
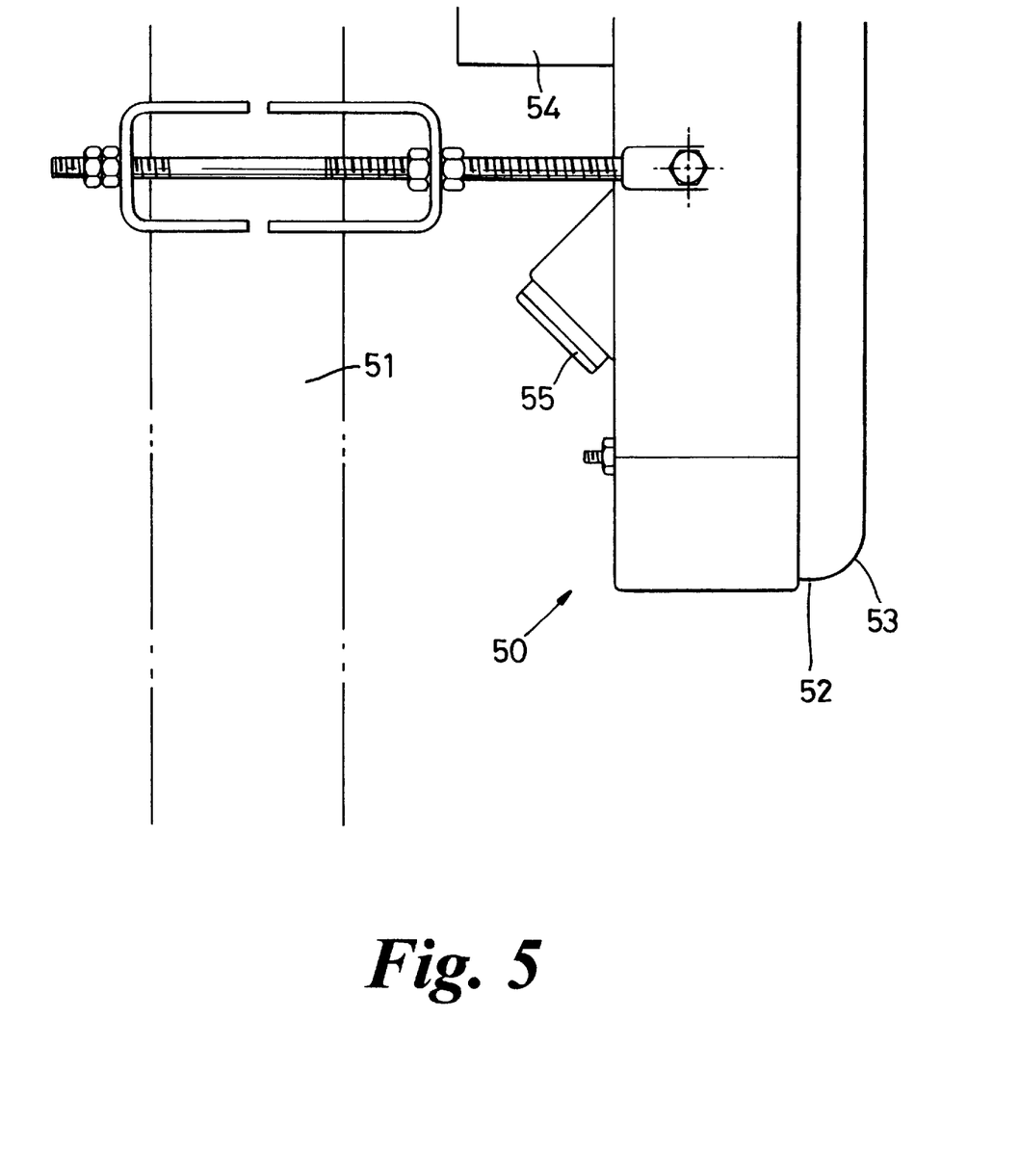
FIG. 5 shows a partial cross-section of a first embodiment in situ on a radome.

Referring now to FIG. 5, there is shown a partial side view of a mounted antenna enclosure 50 clamped to a mast 51 or similar structure. Reference numeral 52 indicates a suitable position through the radome for the placement of a valve made in accordance with the invention. The drain is best placed at the lower point edge of the radome 53 for several reasons: It is sometimes necessary to downtilt the antenna to provide good cell coverage whereby any water will automatically be tailed towards the front. Secondly, it is preferable to drill holes in a plastics material rather than a metallic structure to reduce the chance of metallic swarf collecting and affecting antenna performance by the creation of intermodulation products, which cause resonances to occur at unwanted frequencies and reduce gain of the antennas. Thirdly, if the drain is added to an antenna already in service, then installation can be effected more easily if the hole is cut through a plastics radome rather than a metal frame. Reference numeral 54 indicates the enclosure surrounding the smart control electronics as 55 indicates the angled sockets to which we connected cables which connect with other base station equipment.

Figure 6:
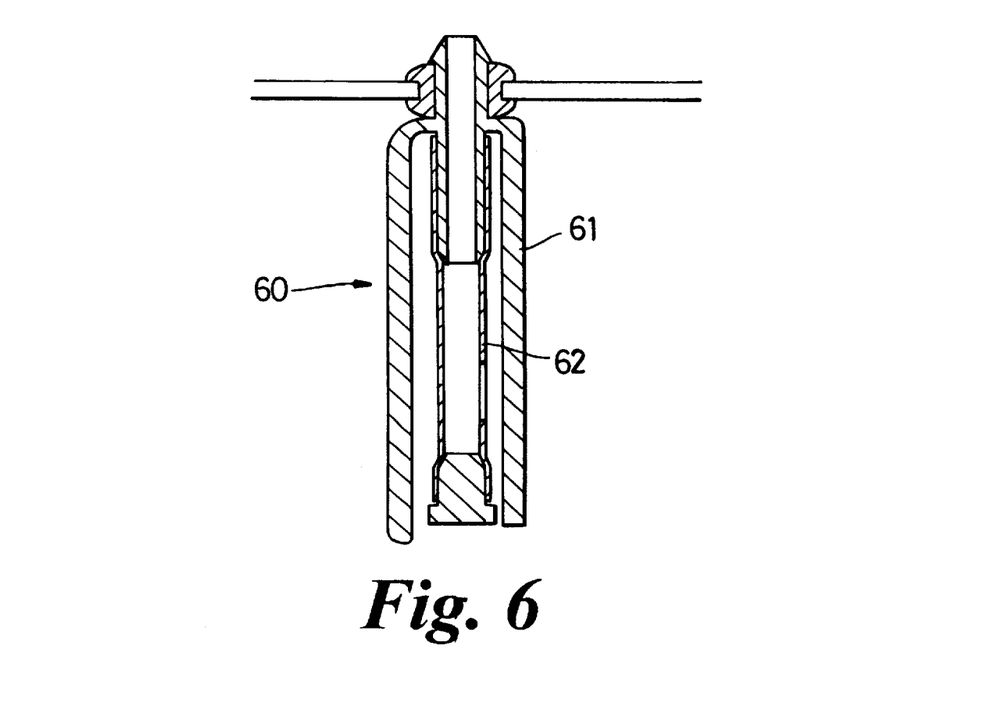
FIG. 6 shows a sectional view of a second embodiment.

A second embodiment is depicted in FIG. 6. The adaptor 60 differs in that a shroud 61 depends therefrom; it encircles the slit tube 62 and so provides a barrier to ultra-violet light; provides a mechanical barrier and provides a more convenient hand hold for installation and inspection purposes. The adaptor and shroud could be made in a integral fashion.

Figure 71:
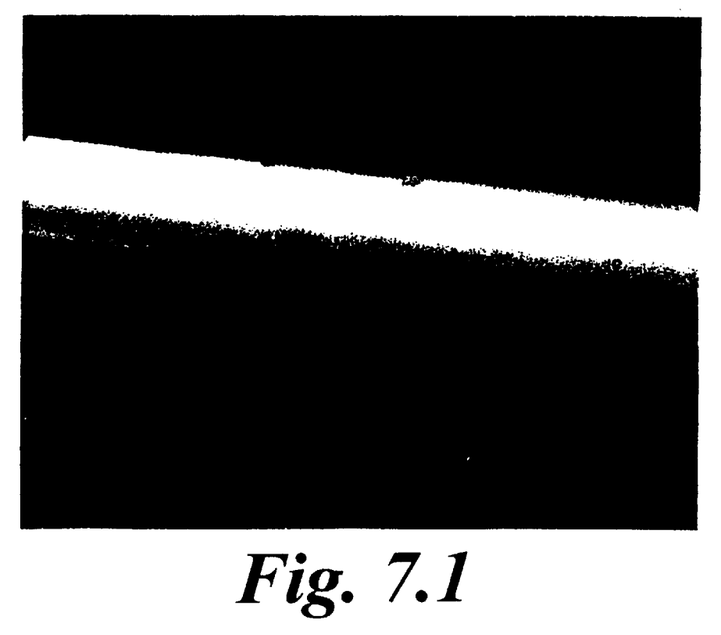
Figure 72:
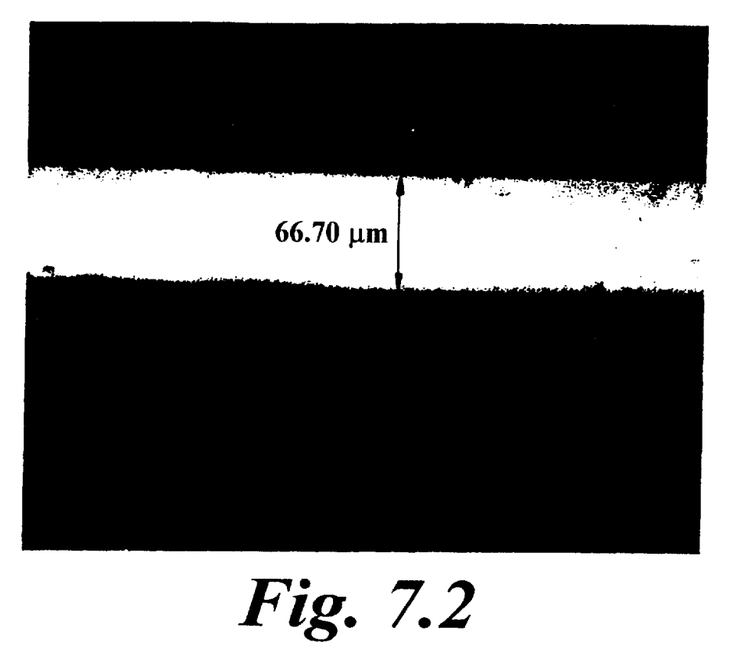

Suitable materials for the custmatic of the drainage tube and grommet are thermoplastic elastomer such as "Santoprene" a polyolefin base material and silicone rubber. FIGS. 7.1 & 7.2 show two photomicrographs of drain tubes showing the slit dimensions in a closed position. The performance of three suitable materials for the components of the drain valve, namely Silicon rubber, Thermoplastic Elastomer, and Nylon 6.6 are compared in a table, table 1 below:

TABLE 1

| PARAMETER | VALUE | Nylon 6.6 | Thermoplastic Elastomer | Silicone Rubber |
|---|---|---|---|---|
| Low air temp | −50° C. | −80° C. dry −65° C. 50% RH | −60° C. | ° C.-60 |
| High air temp | +55° C. | 80–100° C. | 125° C. | 150° C. |
| high RH | 100% | up to 10% absorption | up to 5.5% absorption | up to 10% absorption |
| Solar radiation | 1120 Wm$^2$ | OK if black | OK if black | OK if black |
| Movement of air | 50 m/s | OK | OK | OK |
| Rain intensity | 15 mm/min | OK | OK | OK |
| ice and frost | Yes | OK | OK | Ok |
| Sand | 300 mg/m$^3$ | OK | OK | OK |
| Sea and road salts | Salt mist | Good | Good | Good |
| SO$_2$ | 0.3/1 mg/m$^3$ | Good | Good | Good |
| H$^2$S | 0.1/0.5 mg/m$^3$ | Good | Good | Good |
| Cl$_2$ | 0.1/0.3 mg/m$^3$ | (1) | Good | Good |
| HCl | 0.1/0.5 mg/m$^3$ | (1) | Good | Good |
| HF | 0.1/0.03 mg/m$^3$ | (1) | Good | Good |
| O$^3$ | 0.05/0.1 mg/m$^3$ | (1) | Good | Good |
| No$_n$ | 0.5/1 m/m$^3$ | (1) | Good | Good |
| NH$_3$ | 1/3 mg/m$^3$ | Good | Good | Good |

In general Nylon 6.6 has a poor resistance to these chemicals, however the data available refers to aqueous solutions or high concentrations of gases (circa 100%). Therefore, at these low concentrations there should be no or very little deleterious effect on the component. Nylon has similar radiative and absorptive properties but does not have a good resistance to some chemicals, for these reasons thermoplastic elastomer or silicone rubber are preferred for the construction of a drain tube, although it should be realised that the list is not exhaustive and, indeed, many other suitable materials exist.

The adaptor and bung do not have similar constraints put upon them because they do not have to retain flexibility to maintain in a functioning condition, but solid thermoplastics or corrosion-resistant metals such as anodised aluminium could be employed. The material for the grommet can conveniently be the same as that for the drain tube, since degradation effects for such resilient components will be the same.

The drain valve provides a simple to fabricate and install drain device which can remove water having a head of only a few mm above the top of the slit, within the plastics tube. A further comment worthy of note is that the drain valve is passive and does not, for example, rely upon the operation of an electrical motor or otherwise require an electrical supply.

We claim:

1. A communications electronics enclosure drain valve comprising:

a plastics tube, and;

an adaptor;

the tube being connected to the adaptor at a first end and being closed at a second end;

wherein the tube defines a cylindrical cavity defined by a wall and said tube possesses an axial slit through the wall;

the adaptor defines a channel which communicates with the tube at a first end and provides an orifice at a second end, and;

wherein the drain valve is adapted for attachment to an area of the electronics enclosure susceptible to the accumulation of liquid by way of the adaptor, with the orifice being positioned to receive excess liquid and the valve is adapted to allow the flow of liquid through the orifice, the tube and then the slit with a minimal head of water.

2. A drain valve according to claim 1 wherein the tube is terminated by a bung comprising a solid, non-porous material of circularly cylindrical cross-section having the dimensions of an external diameter corresponding to the internal diameter of the tube.

3. A drain valve according to claim 2 wherein the bung is of a friction fit or is attached by clamp means.

4. A drain valve according to claim 1 wherein the adaptor can interface directly with the wall of the electronics enclosure.

5. A drain valve according to claim 1 wherein the adaptor can interface with the wall of the electronics enclosure by means of a seal comprising a sealing washer.

6. A drain valve according to claim 1 wherein the adaptor protrudes above a lower level of the electronics enclosure whereby any debris which may be present does not flow into the orifice.

7. A drain valve according to claim 1 wherein the tube and grommet manufactured from a similar plastics material.

8. A drain valve according to claim 1 wherein the adaptor and bung are manufactured from a solid corrosion-proof material.

9. A drain valve according to claim 1 wherein the drain valve is constructed in an integral fashion employing injection moulding techniques.

10. A communications electronics enclosure drain valve comprising: a plastics tube, closed at one end, the open end being adapted to receive liquids from and to be sealed with the enclosure, wherein the tube defines a cylindrical cavity defined by a wall and said tube possesses an axial slit through the wall; and wherein the drain valve is adapted for attachment to an area of the electronics enclosure susceptible to the accumulation of liquid by way of an adaptor, with the orifice being positioned to receive excess liquid and the valve is adapted to allow the flow of liquid through the orifice, the tube and then the slit with a minimal head of water.

11. A communications electronics enclosure comprising electronic equipment and having a drain valve, said drain valve comprising: a plastics tube, closed at one end, the open end being adapted to receive liquids from and be sealed with the enclosure, wherein the tube defines a cylindrical cavity defined by a wall and said tube possesses an axial slit through the wall; and wherein the drain valve is adapted for attachment to an area of the electronics enclosure susceptible to the accumulation of liquid by way of an adaptor, with the orifice being positioned to receive excess liquid and the valve is adapted to allow the flow of liquid through the orifice, the tube and then the slit with a minimal head of water.

12. A method of draining liquid from a communications electronics enclosure, the electronics enclosure including a drain valve positioned in an area of the electronics enclosure susceptible to the accumulation of liquid, the drain valve comprising: a plastics tube, and; an adaptor; the tube being connected to the adaptor at a first end and being closed at a second end; wherein the tube defines a cylindrical cavity defined by a wall and said tube possesses an axial slit through the wall; the adaptor defines a channel which communicates with the tube at a first end and provides an upwardly facing orifice within the enclosure at a second end, the orifice providing an entrance for liquid to the cylindrical cavity, the method, upon ingress of liquid into the enclosure such that the level of the surface of the water exceeds the height of the lowest level of the orifice, comprising: removal of such liquid by gravitational forces through the orifice and within the tube, the weight of the liquid urging the slit to open and allow such liquid to escape.

* * * * *